July 30, 1968  J. P. BOGOSOFF ET AL  3,394,612
STEERING COLUMN ASSEMBLY
Filed Sept. 15, 1966  2 Sheets-Sheet 1
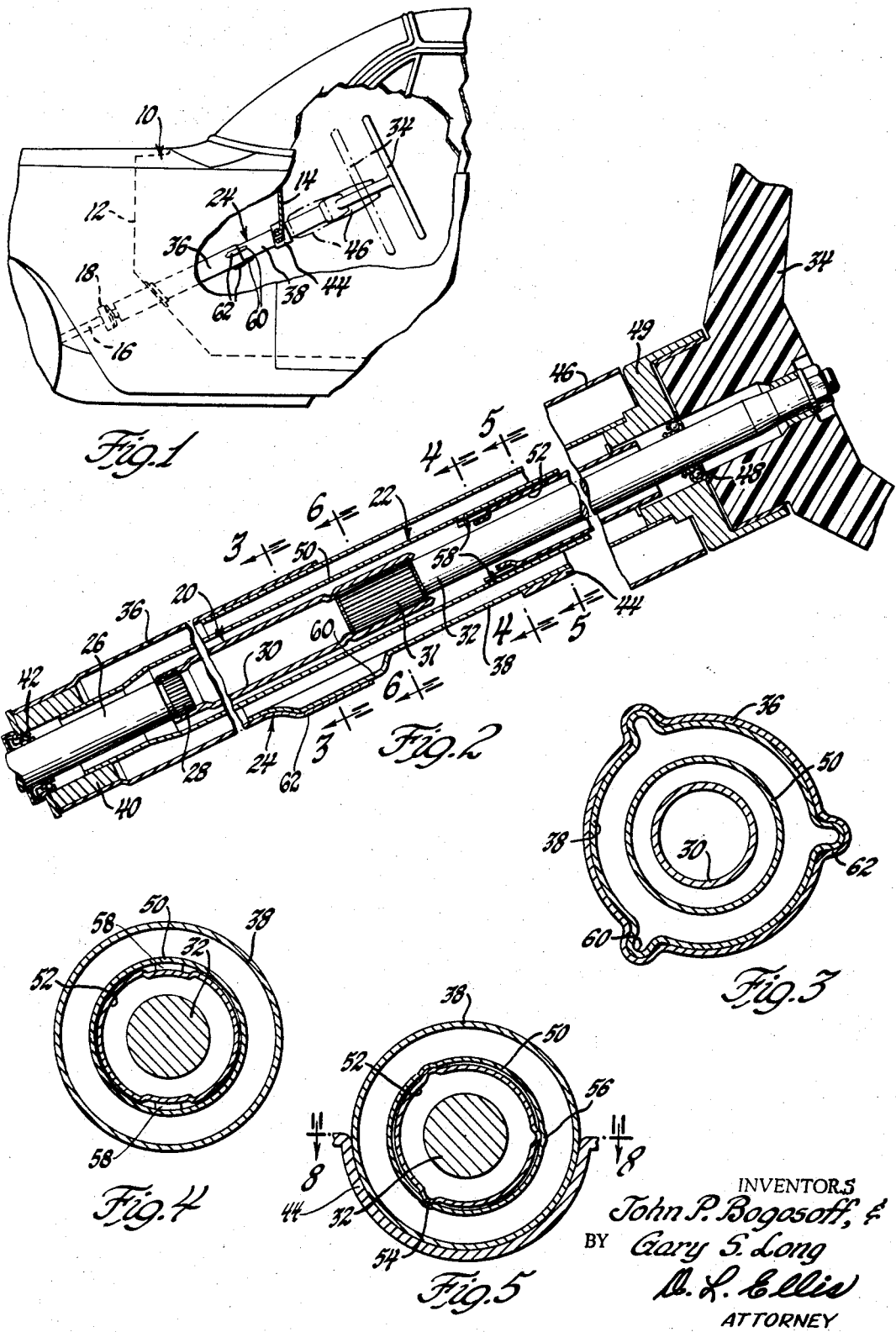
INVENTORS
John P. Bogosoff, &
BY Gary S. Long
D. L. Ellis
ATTORNEY July 30, 1968  J. P. BOGOSOFF ET AL  3,394,612
STEERING COLUMN ASSEMBLY
Filed Sept 15, 1966  2 Sheets-Sheet 2

INVENTORS
John P. Bogosoff, &
BY Gary S. Long

D.L. Ellis
ATTORNEY

United States Patent Office 3,394,612
Patented July 30, 1968

---

3,394,612
STEERING COLUMN ASSEMBLY
John P. Bogosoff, Battle Creek, and Gary S. Long, East Lansing, Mich., assignors to General Motors Corporation, Detroit, Mich., a corporation of Delaware
Filed Sept. 15, 1966, Ser. No. 579,650
2 Claims. (Cl. 74—492)

This invention relates to steering column assemblies and more particularly to collapsible steering column assemblies.

One feature of this invention is that it provides an improved impact collapsible steering column assembly. Another feature of this invention is that is provides an improved collapsible steering column assembly including an impact energy absorption member having a pair of telescopically related sections, one of which includes a radially enlarged or projecting portion subject to predetermined interfering engagement with the wall of the other section during telescoping between the sections under impact whereby to strip or deform said other section along the length thereof for dissipation of the impact energy. A further feature of the invention is that such an energy absorption member is incorporated directly within the conventional mast jacket or support tube of the steering column assembly.

These and other features of the invention will be readily apparent from the following specification and drawings wherein:

FIGURE 1 is a fragmentary partially broken away elevational view of an automotive vehicle including a steering column assembly according to this invention;

FIGURE 2 is an enlarged sectional view of the steering column assembly;

FIGURE 3 is an enlarged sectional view taken generally along the plane indicated by the line 3—3 of FIGURE 2;

FIGURE 4 is an enlarged sectional view taken generally along the plane indicated by the line 4—4 of FIGURE 2;

FIGURE 5 is an enlarged sectional view taken generally along the plane indicated by the line 5—5 of FIGURE 2;

Referring now particularly to FIGURE 1 of the drawings, the steering column assembly of the invention is shown arranged within the passenger compartment of a vehicle body 10 including a fire wall 12, indicated in broken lines, and a conventional instrument panel structure, a vertical wall portion of which is indicated at 14. The vehicle includes a conventional steering gear, not shown, from which extends a steering gear input shaft 16 carrying a flex coupling indicated at 18.

Figure 6:
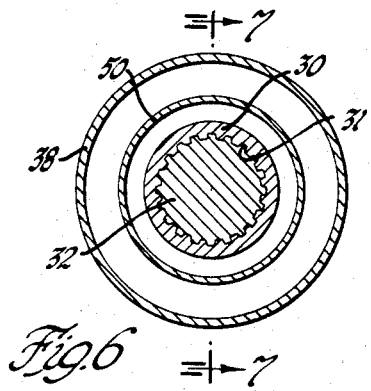
FIGURE 6 is an enlarged sectional view taken generally along the plane indicated by the line 6—6 of FIGURE 2.
Figure 7:
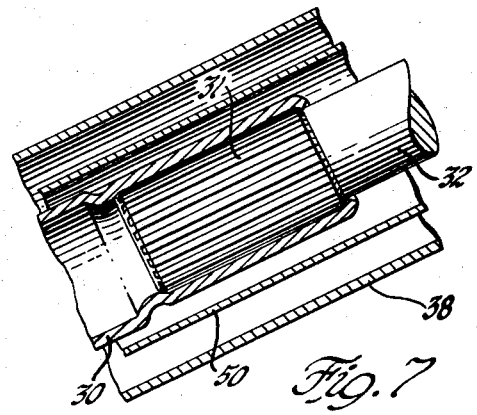
FIGURE 7 is a sectional view taken generally along the plane indicated by the line 7—7 of FIGURE 6.

Referring to FIGURE 2, the steering column of the invention generally includes a steering shaft assembly 20, a shift tube assembly 22 and a support tube or mast jacket assembly 24. Steering shaft assembly 20 is of three sections including a lower rod section 26 suitably secured to flex coupling 18 for driving connection with input shaft 16. The upper end of rod section 26 is splined at 28 and has nonrotatably compressed or crimped thereover the lower end of an intermediate tube section 30, the upper end of which has a similar splined connection 31 with the lower end of an upper rod section 32. As seen best in FIGURE 7, spline connection 31 is again provided by compressing or crimping an upper reduced diameter endportion of tube section 30 over the splines on rod section 32, with the flange and a rib being provided respectively at the upper and lower ends of the crimp for firm axial location between the sections. The upper end of rod section 32 has affixed thereto in conventional manner the hub of the usual steering wheel 34.

Mast jacket assembly 24, as presently disclosed, includes, includes two telescopically related tube sections 36 and 38. Lower section 36 extends through a suitable aperture in fire wall 12 and carries at its lower end a bearing block 40 mounting a ball bearing assembly 42 supporting the rod section 26. As shown best in FIGURE 9, upper section 38 has welded or otherwise affixed thereto a generally U-shaped mounting bracket 44 having ears provided with open ended slots suitable for receiving bolts projecting from wall portion 14 whereby to releasably mount the upper end of the mast jacket assembly on the vehicle instrument panel. The upper end of upper section 38 rotatably supports in conventional manner a shift lever barrel 46 and further mounts a turn signal cluster 49, with a ball bearing assembly 48 being interposed between the cluster 49 and the rod section 32.

Figure 8:
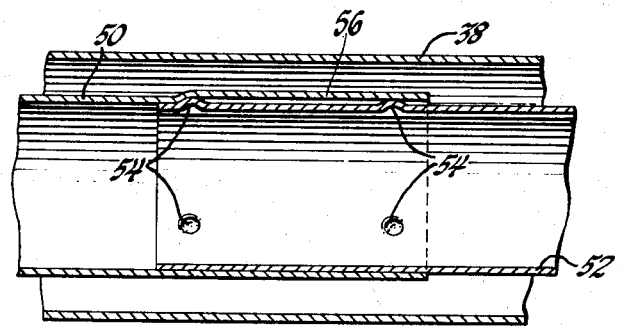
FIGURE 8 is a sectional view taken generally along the plane indicated by the line 8—8 of FIGURE 5.

Shift tube assembly 22 comprises a pair of telescopically related tube sections 50 and 52 arranged within the mast jacket assembly and about the steering shaft assembly to have the lower end of lower section 50 rotatably supported in bearing block 40 and to have the upper end of upper section 52 secured to the hub, not shown, of shift barrel 46. The lower end of lower section 50 is adapted to carry in conventional manner the usual radially extending operating arm connecting with the vehicle power transmission selector linkage. As shown best in FIGURES 5, 8 and 9, upper and lower sections 50 and 52 are assembled with a force or press fit by reason of a pair of circumferential series of radial dimple projections 54 on upper section 52 which, when the two sections are forcibly joined, deform or raise ridges 56 in the lower section 50 and contract the intervening circumferential portions thereof about upper section 52. In addition to the firm axial and rotative securement thus provided between the members, lanced tabs 58 are bent downward into lanced slots in upper section 52, best seen in FIGURES 2 and 4, to insure positive rotational connection between the sections.

Figure 9:
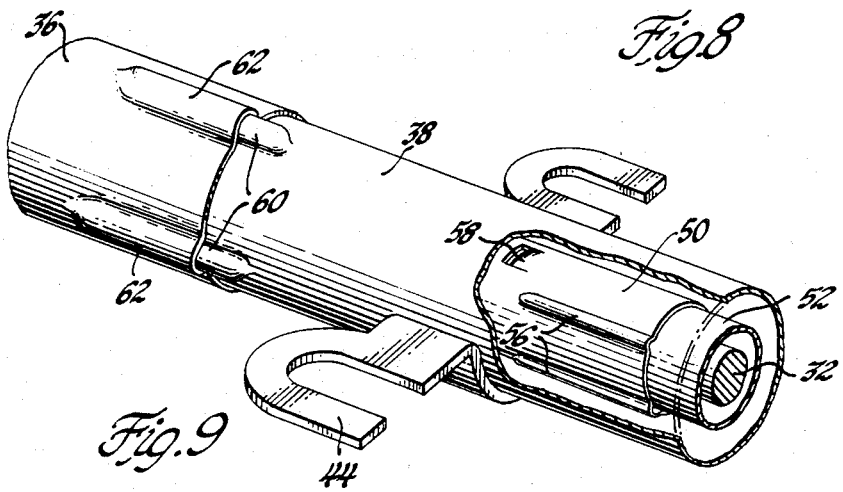
FIGURE 9 is a perspective view.

As viewed best in FIGURES 3 and 9, the mast jacket sections 36 and 38, like the shift tube sections 50 and 52, are assembled with a force or press fit, upper section 38 being formed with a circumferential series of radial projections or embossments 60 which raise ribs 62 in the lower section 36 when the sections are forced together. The leading end of each embossment 60 is provided with a somewhat concave profile to induce the deformation of lower section 36. Again, the raising of the ribs 62 during assembly contracts the intervening portions of the circumference of lower section 36 about upper section 38 for a firm securement therebetween.

In the event of an impact on the steering column, whether it be rearwardly directed from the steering gear or forwardly directed onto the steering wheel, the three columnar assemblies 20, 22 and 24 will axially collapse or telescope when the impact reaches a predetermined level. This level is determined by the resistance offered by lower mast jacket section 36 to further deformation by the embossments 60, and by the resistance encountered in the shift tube lower section 50 to further deformation by the dimples 54. Further, the impact required will be partially dictated by the force necessary to destroy the rib at the lower end of the crimp spline connection 31. Once having reached the required impact level, the upper steering shaft rod section 32 may freely pass or telescope within the tube section 30. The shift tube sections may also telescope, but with some resistance due to the deformation necessitated by dimples 54. The embossments 60, however, provide a primary energy absorption mechanism during collapse. The embossments are sized to have a predetermined degree of interference engagement with the normally annular interior surface of lower section 36 causing further radial deformation or lengthening of ribs 62, the consequent plastic strain in the wall material of lower section 36 serving to dissipate substantially the energy of the impact on the column. This, together with the relatively smaller amount of material plastic deformation obtaining in the shift tube assembly, provides for controlled resistance or retardation of the collapse of the three columnar assemblies of the steering column.

It will be noted that by virtue of slots in the ears of the mounting bracket 44 permitting escape of the instrument panel mounting bolts in only one direction, the upper section 38 of mast jacket assembly 24 is permitted to move toward the steering gear against the reaction provided by the bottoming of bearing block 40 on flex coupling 18, but is prevented from being pushed rearwardly toward the passenger. Accordingly, the mast jacket assembly provides not only for energy absorption on impact directed forwardly of the vehicle, but also on impact directed rearwardly from the steering gear by reason of the reaction available to such rearward impact from the wall portion 14 of the instrument panel.

Having thus described the invention, what is claimed is:

1. In a vehicle including a steering gear, a manual steering instrumentality, and telescopic steering shaft means interconnecting said steering gear and said manual instrumentality, a tubular energy absorption member arranged about said steering shaft intermediate said steering gear and said manual instrumentality and including a pair of telescopically related tube sections, one of said sections being provided with a circumferential series of embossments raised from the wall thereof and having predetermined interfering engagement with the wall of the other of said sections upon telescopic movement therebetween, said embossments causing a predetermined degree of progressive deformation of the wall of said other tube section along the length thereof during said telescopic movement to provide controlled resistance to telescopic movement of said steering shaft means.

2. The combination recited in claim 1 wherein said steering shaft means is rotatably supported on said energy absorption member, and means releasably mounting said member on the vehicle in a manner permitting movement of the manual instrumentality end thereof relative to the vehicle in a direction toward the steering gear end thereof only.

References Cited
UNITED STATES PATENTS

| | | | |
|---|---|---|---|
| 3,144,918 | 8/1964 | Picton et al. | 188—1 |
| 3,262,332 | 7/1966 | Wight | 74—493 |
| 3,308,908 | 3/1967 | Bunn | 188—1 |

MILTON KAUFMAN, *Primary Examiner.*